UNITED STATES PATENT OFFICE.

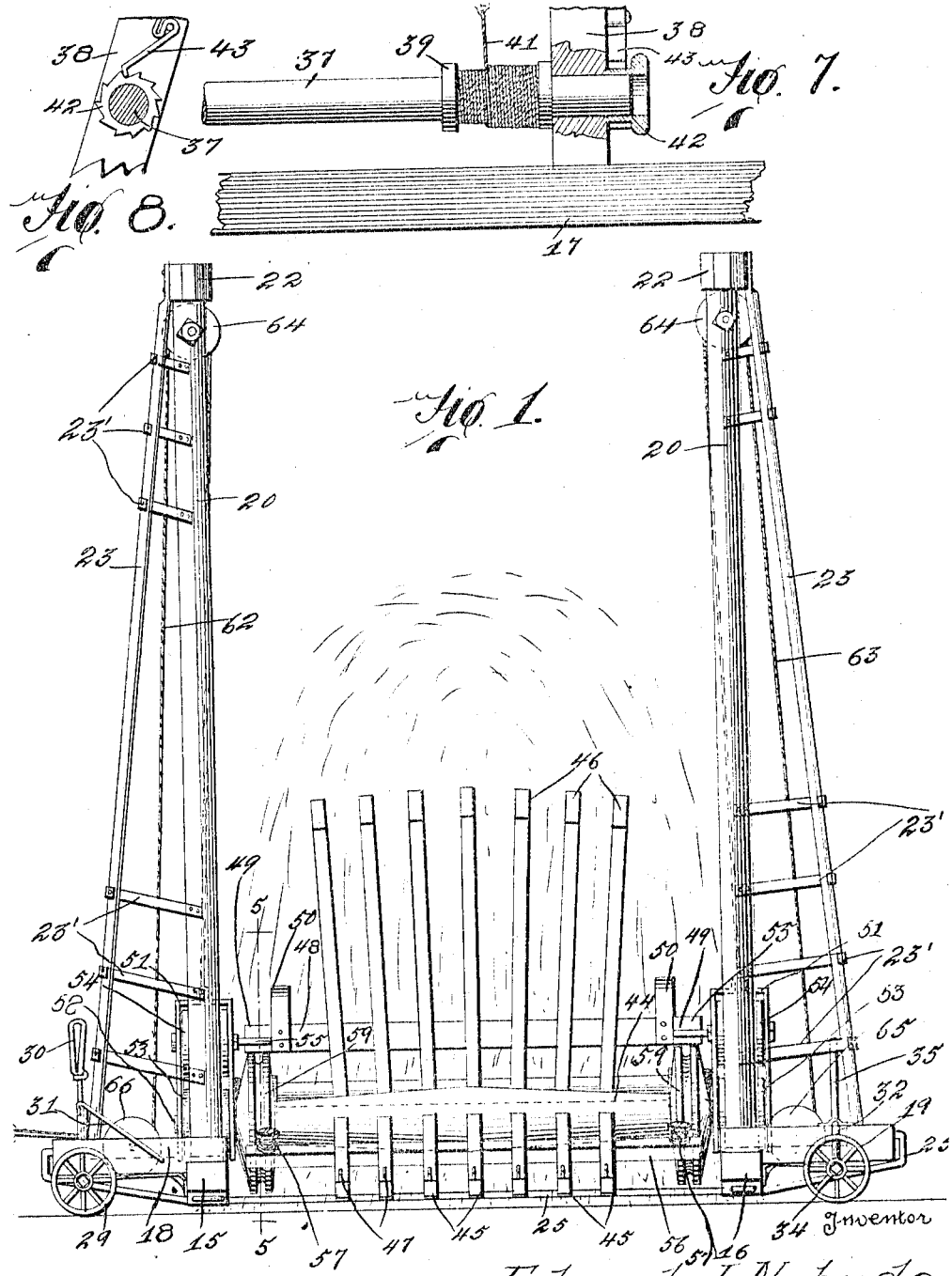

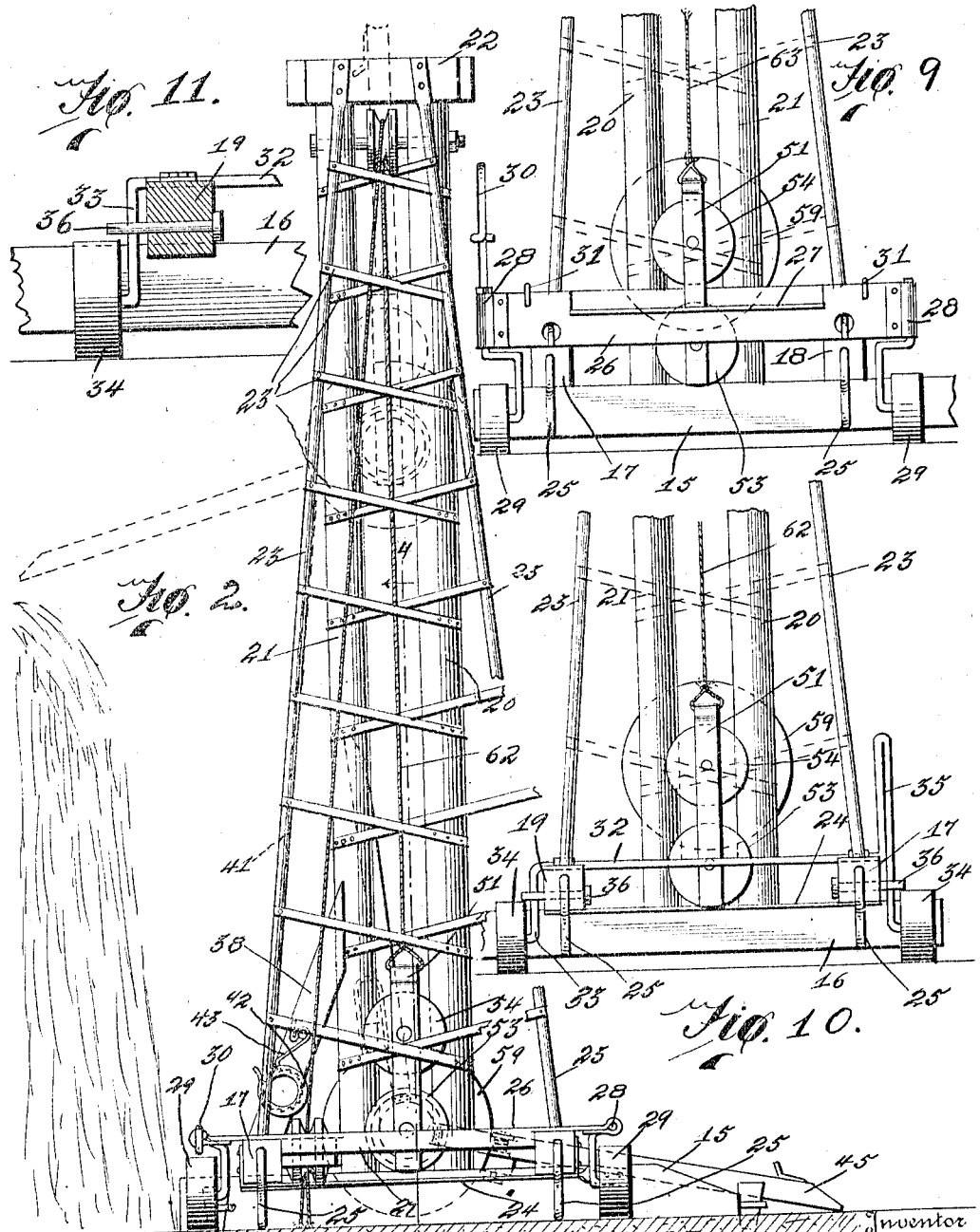

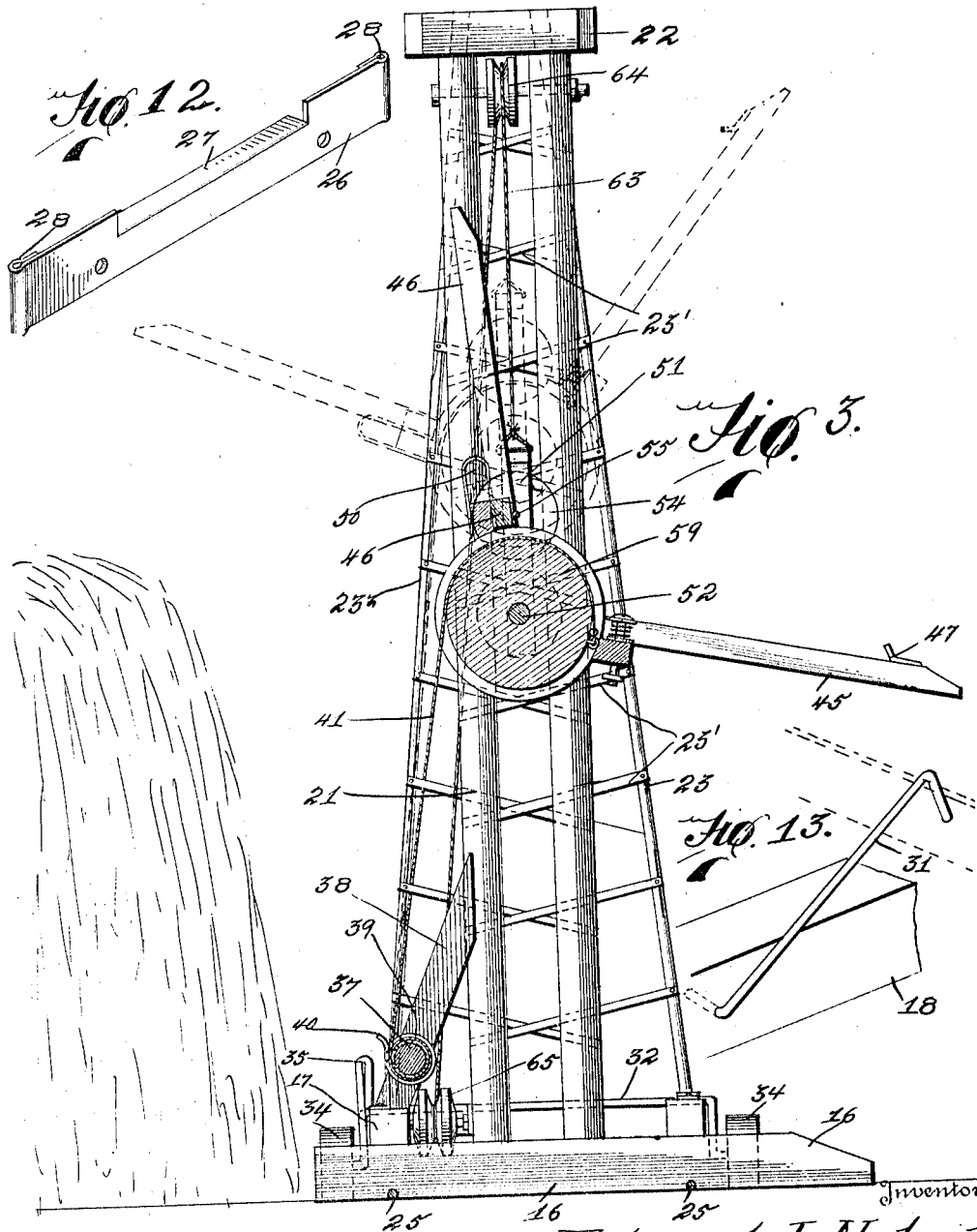

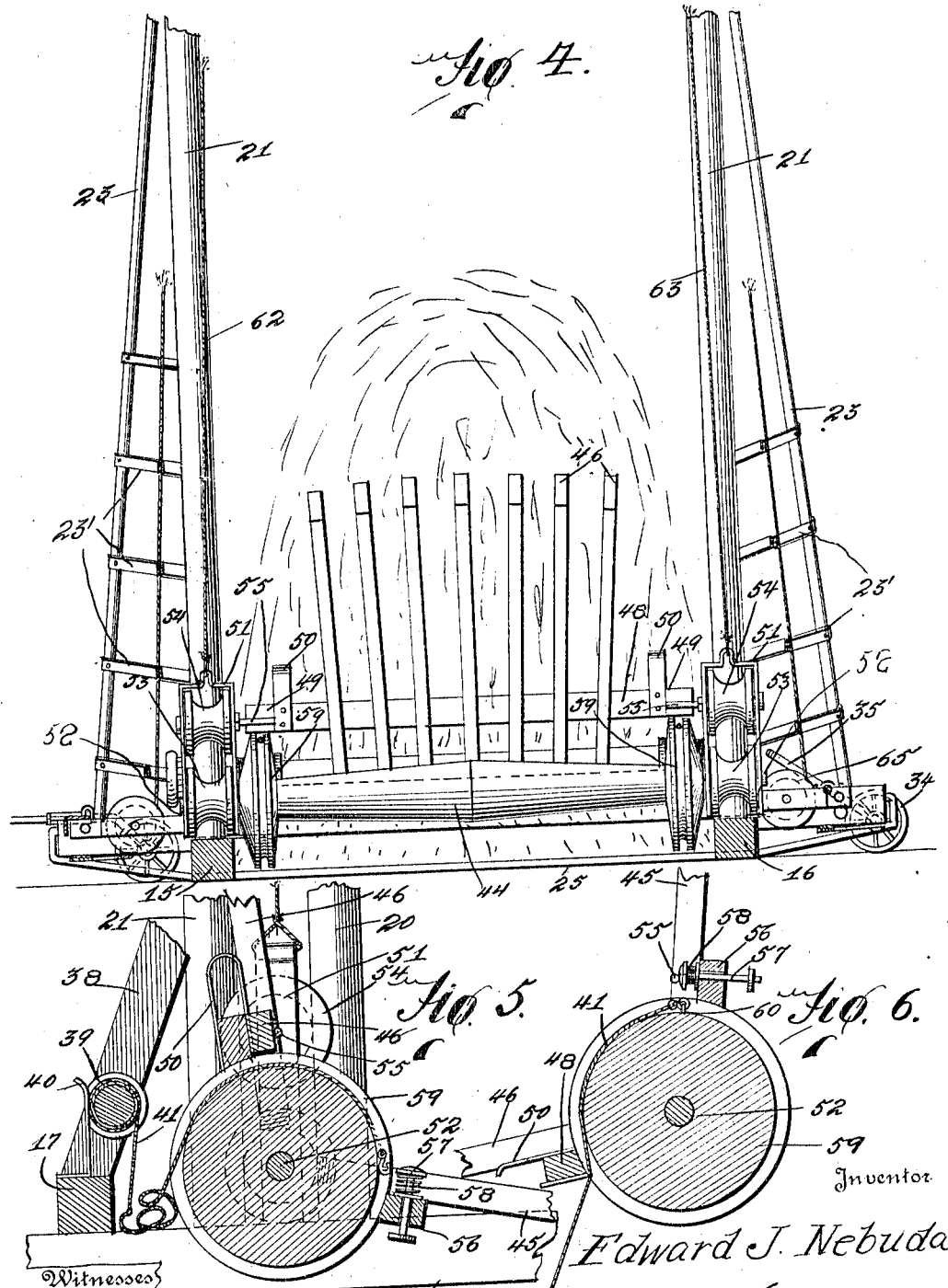

EDWARD J. NEBUDA, OF WESTPOINT, NEBRASKA.

HAY-STACKER.

1,099,190.   Specification of Letters Patent.   Patented June 9, 1914.

Application filed November 15, 1913. Serial No. 801,205.

*To all whom it may concern:*

Be it known that I, EDWARD J. NEBUDA, a citizen of the United States of America, residing at Westpoint, in the county of Cuming and State of Nebraska, have invented certain new and useful Improvements in Hay-Stackers, of which the following is a specification, reference being had therein to the accompanying drawing.

This invention relates to a hay stacker and the principal object of the invention is to provide a device by means of which hay from a hay sweep can be easily and quickly conveyed to the top of a hay stack. This will greatly facilitate the building of the stack and will thus save a great deal of labor and time.

Another object of the invention is to provide the hay stacker with an improved fork which is so constructed that the hay may be placed upon certain of the prongs and then passed over the remaining prongs so that it will fall over onto the top of the stack.

Another object of the invention is to provide the fork with an improved dumping means so constructed that the fork can be caused to dump at any height desired. This permits the stacker to be adjusted so that the hay will be at all times dumped upon the top of the stack without being dropped from too great a height.

Another object of the invention is to provide the stacker with an improved frame which is so constructed that it may be readily moved from one place to another and then have its wheels raised so that the body of the frame will rest upon the ground.

With these and other objects in view, this invention consists of certain novel combinations, constructions and arrangements of parts, which will be hereinafter fully described and claimed.

This invention is illustrated in the accompanying drawings, wherein:

Figure 1 is a front view of the hay stacker. Fig. 2 is an end view of the stacker, the dotted line position of the fork showing the fork in a position to dump the hay upon the top of the stack. Fig. 3 is a vertical transverse sectional view through the stacker, with the fork shown partly raised in full lines; indicated in a position to dump by dotted lines. Fig. 4 is a vertical sectional view taken along the line 4—4 in Fig. 2. Fig. 5 is a sectional view taken along the line 5—5 in Fig. 1. Fig. 6 is a fragmentary sectional view through the hub of the fork with the fork in a position to dump the hay. Fig. 7 is a fragmentary view of the lower portion of the frame and the shaft which carries the lines controlling the height at which the fork will dump. Fig. 8 is a fragmentary view showing the pawl and ratchet which holds the shaft shown in Fig. 7 in an adjusted position. Fig. 9 is a diagrammatic view of the machine with the rollers lowered. Fig. 10 is a view similar to Fig. 9 looking at the opposite end of the machine. Fig. 11 is a fragmentary view showing the manner in which the rollers shown in Fig. 10 are kept in a lowered position. Fig. 12 is a perspective view of the plate shown in Fig. 9. Fig. 13 is a view of the latch which engages the bar shown in Fig. 12 to hold the same in the position shown in Fig. 9.

This invention is provided with a frame having the two cross beams 15 and 16 which are connected by the rear longitudinally extending bar 17. Short arms 18 and 19 are secured to the cross beams 15 and 16 and extend parallel to the bar 17. Standards 20 and 21 are secured to each of the cross beams 15 and 16 and are held in spaced relation by the top blocks 22 with which the bracing bars 23 are connected. These bracing bars have their lower ends rigidly connected with the ends f the bar 17 and arms 18 and 19 and thus form supports for the standards. The end portions of the bar 17 are connected with the arms 18 and 19 by the bracing strips 24 so that these arms will be braced and prevented from having any tendency to move away from the bar 17. Longitudinally extending rods 25 positioned beneath the cross beams 15 and 16 have their ends connected with the ends of the bar 17 and arms 18 and 19, so that the frame will be braced longitudinally, and straps 23' connect the standards and braces 23.

A plate 26 is pivotally connected with the arm 18 and one end of the bar 17 and has one side portion cut to form a tongue 27 which is bent as shown in Fig. 12, so that when the plate is in the position shown in Fig. 2, the tongue will extend between the ends of the bar and the arm. The ends of the plate 26 are bent as shown to form bearings 28 so that the supporting shaft of the wheel 29 can be rotatably connected with the plate 26. The end of the shaft of one of the rollers is extended to form a lever 30 by means of which the plate can be raised to the position shown in Fig. 9 so that the frame will be supported by the rollers and can thus be easily moved from one place to another. Latches 31 are carried by the arm 18 and are intended to engage the plate 26 as shown in Fig. 9 so that the plate will be held in a raised position. A rod 32 is rotatably connected with the arm 19 and the opposite end portion of the bar 17 and has one end portion 33 bent to form a support for the wheel 34. The opposite end portion of the rod 32 is first doubled to form the lever 35 and is then bent to form a support for the second supporting wheel 34. Pins 36 are passed through the arm 19 and bar 17 and are intended to engage the end portions of the rod 32 and prevent the rod from moving from the position shown in Fig. 10. It is, of course, obvious that these pins are slidably mounted so that when it is desired to lower the frame, these pins may be withdrawn and the wheels raised. A shaft 37 is rotatably mounted in openings formed in the diagonal braces 38 and carries drums 39 which are positioned in alinement with brake strips 40 so that lines 41 which are wound upon the drums 39 will be engaged by the strips 40 and prevented from slipping loose when the fork is lowered. This shaft 37 extends through one of the braces 38 and carries a ratchet collar 42 which is engaged by a pawl 43 so that the shaft may be held stationary after a sufficient amount of line has been let out. By means of this construction the extent to which the fork may be raised can be regulated since the lines 41 are connected with the fork, and thus form stops to limit the raising of the fork. It will be further explained that these lines are so connected with the fork that when the fork is raised a certain amount they will cause the fork to rotate and thus dump the hay upon the stack.

The fork comprises a hub 44 which is provided with the forward teeth 45 and rear teeth 46. The forward teeth are provided with hooks 47 near their outer ends so that the hay positioned upon the teeth 45 will be prevented from slipping off while the fork is being raised. The rear teeth 46 are connected by the cross-bar 48 which extends beyond the teeth 46 and is provided with abutment blocks 49 and U-shaped shoes 50. These shoes are intended to strike the drums 39 as the fork is lowered and turn the fork to the position shown in Fig. 2. Brackets 51 are mounted upon the pins 52 in the ends of the head 44 and straddle the rollers 53 mounted upon the pins 52. These brackets 51 also carry rollers 54 which have their supporting pins 55 carried inwardly to form stops which are engaged by the blocks 49. These pins 55, therefore, not only form axles for the rollers 54, but also form abutments to stop the pivotal movement of the fork. The cross-bars 56 of the teeth 46 carry pins 57 which are so positioned that their heads will strike pins 55 as shown in Fig. 6 and limit the pivotal movement of the fork when dumping the hay. Springs 58 are placed upon the pins 57 thus causing the pins 57 to form resilient bumpers which will take up jar. Drums 59 are carried by the hub 44 and are provided with eyes 60 so that the lines 41 may be connected with the drums. It should be noted that the lines are partially wound about the drums when in the normal position shown in Fig. 5, so that when the fork is raised as far as the line 41 will permit, it will turn as shown in the dotted line position in Fig. 2, thus permitting the hay to slip off the teeth 46 onto the hay stack which is being built. Cables 62 and 63 are secured to the brackets 51 and are then carried upwardly between the standards 20 and 21 and passed about the pulley 64 mounted between the upper ends of the standards. The cable 63 is then brought downwardly and after being passed around the pulley 65 is carried over the cross-beams 15 and 16 and passed beneath the pulley wheel 66. The cable 62 is brought downwardly and after being passed beneath the pulley 66 is connected with the cable 63 so that these cables form a continuous cable. It is, of course, obvious that these cables may be formed of one length of rope which is doubled intermediate its length and which has its ends passed beneath the pulleys 65 and 66 and then carried up over the pulleys 64 and down to the brackets 51. The upper ends of the cables are connected with a suitable draft appliance, which is not shown, so that the draft animals may be connected with the cables and the fork raised by driving the draft animals away from the hay stacking machine.

The operation of this device is as follows: The wheels are lowered so that the frame is supported by the wheels and the frame is then drawn across the field where it is desired to build the stack. The wheels are then raised so that the frame rests upon the ground and the draft animals are connected with the cables 62 and 63 and the machine is then ready for use. As soon as the sufficient amount of hay has been placed upon the fork, the draft animals are driven away from the machine and this will cause the brackets 51 to be drawn upwardly until the fork has been raised as far as the lines 41 will permit. As soon as the fork reaches the height permitted, the lines 41 will cause the fork to rotate rearwardly and this will cause the hay to slide from the teeth 45 on to the teeth 46 from which the hay will slide on to the top of the stack. As the stack increases in height the latch 43 will be raised and the shaft 37 turned so that the lines 41 will be unwound thus permitting the fork to be raised higher before it turns to dump the hay. After the hay has dropped from the teeth 46 on to the stack, the draft animals are driven toward the frame and this permits the fork to descend until it reaches the bottom of the frame. When the fork reaches the bottom of the frame, the shoes 50 will strike the drums 39 and this will cause the fork to be returned to its normal position which is shown in full lines at the bottom of Fig. 2. This process can be repeated until the stack has reached the desired height and the machine can then be moved to the place where it is desired to build a second stack or it may be driven back to the shelter from which it was taken.

What is claimed, is:—

1. A hay stacker comprising a frame, carriages slidably connected with said frame, a fork rotatably connected with said carriages, said fork including a hub, teeth carried by said hub, drums carried by said frame, means wound upon said last mentioned drums and having their outer ends partially wound about said first mentioned drums, means for holding said second mentioned drums in an adjusted position for limiting the amount of line unwound, and means for raising said carriages whereby said fork may be raised as far as permitted by said lines and then caused to rotate by said lines being partially wound about the drums of said fork.

2. A hay stacker comprising a frame, carriages slidably connected with said frame, a fork pivotally connected with said carriages and comprising a hub, teeth extending from said hub, drums carried by said hub, lines partially wound about said drums and adjustably connected with said frame, and means for raising said carriages as far as permitted by said lines, said lines causing said fork to rotate when said fork has been raised as far as permitted by the lines.

3. A hay stacker comprising a frame, standards forming part of said frame, brackets between said standards, rollers rotatably connected with said brackets and positioned between said standards, a rotatable fork having its hub provided with pins forming pivot pins for the lower ones of said rollers, the pivot pins of the upper rollers extending above the end portions of the hub of said fork whereby they will form abutments to limit the pivotal movement of said fork, means carried by said frame and connected with said fork for limiting the upward movement of the fork and for causing the fork to rotate upon reaching its uppermost position, and means engaging said brackets for raising said brackets to elevate said fork.

4. A hay stacker comprising a frame, carriages slidably carried by said frame, a fork pivotally connected with said carriages, said fork comprising a hub, teeth extending from said hub, cross-bars connecting said teeth, bumpers carried by said cross-bars and adapted to engage portions of said carriages whereby the pivotal movement of said fork may be limited, shoes carried by one of said cross-bars for engaging a portion of said frame and returning said fork to its normal position when lowered, means carried by said frame and engaging said fork for limiting its upward movement and causing the fork to rotate upon reaching its uppermost position, and means for raising said carriages.

5. A hay stacker comprising a supporting body, vertical parallel standards carried by the upper portion of said body, a fork positioned between said standards, said fork comprising a hub having teeth extending at right angles therefrom, drums fixedly secured upon the ends of said hub, pins extending beyond the outer faces of said drums, a U-shaped bracket secured to said pins, a pair of rollers carried within each of said brackets, said rollers adapted to be positioned between a pair of said parallel standards whereby said fork will be guided up said standards, means secured to U-shaped brackets for lifting said fork, and means connected to said drums to automatically swing said fork when the same reaches a predetermined height.

6. A hay stacker comprising a supporting base, parallel vertical standards carried by said base, a fork positioned between said standards, said fork comprising a hub having teeth extending therefrom, drums fixedly secured to the ends of said hub, a U-shaped bracket secured to the outer face of each drum, rollers carried within said U-shaped brackets, said rollers adapted to be positioned between a pair of parallel standards whereby said fork will be guided by said standards, means for lifting said U-shaped brackets whereby said fork will be lifted, a plurality of said rollers carried by said U-shaped brackets provided with pins extending for a determined distance beyond the inner faces of said brackets, a plurality of said teeth provided with transverse pins having enlarged heads, springs positioned upon said pins thereby forming bumpers, said bumpers adapted to strike upon the pins extending from said brackets to relieve the jar, when the fork swings rearwardly, U-shaped spring shoes carried by the remaining teeth, said U-shaped shoes adapted to strike upon said base when the fork moves downwardly whereby said fork will be swung to its correct position, and means for tilting said fork when the same reaches a predetermined height.

7. A hay stacker of the class described comprising a supporting base, a plurality of vertical parallel standards carried upon said base, a fork positioned between said standards, said fork comprising a hub having teeth extending therefrom, drums fixedly secured upon the ends of said hub, means secured to the ends of said hub for elevating the fork, a pair of diagonal braces secured to said base and to said vertical standards, a shaft carried by said braces whereby said shaft will be positioned at a spaced distance from said standards, means for holding said shaft in a set position, cables secured to said shaft and passing partially around said drums whereby said fork will be tilted rearwardly when the fork reaches a predetermined height, transverse braces secured to said teeth, one of said transverse braces provided with a pair of U-shaped spring shoes, said shoes positioned beneath the lower surface of said teeth, said shoes adapted to strike upon said shaft when said fork moves toward the lower portions of said standards whereby said fork will be swung to its correct position, and said spring shoes being adapted to take up the jar imparted by the fork striking upon the shaft.

In testimony whereof I hereunto affix my signature in presence of two witnesses.

EDWARD J. NEBUDA.

Witnesses:
 FRANK MILLER,
 J. W. FALTYS.